No. 878,655. PATENTED FEB. 11, 1908.
G. F. MILLER.
PACKING OF PIPE JOINTS.
APPLICATION FILED MAY 22, 1906.

WITNESSES:
Fred White
René Muine

INVENTOR:
Gustav Franz Miller,
By Attorneys
Arthur C. Fraser & Usina

UNITED STATES PATENT OFFICE.

GUSTAV FRANZ MILLER, OF FRANKFORT-ON-THE-MAIN, GERMANY.

PACKING OF PIPE-JOINTS.

No. 878,655.      Specification of Letters Patent.      Patented Feb. 11, 1908.

Application filed May 22, 1906. Serial No. 318,271.

*To all whom it may concern:*

Be it known that I, GUSTAV FRANZ MILLER, a citizen of Confederation of Switzerland, residing in Frankfort-on-the-Main, in the Empire of Germany, and whose post-office address is 64 Frankfurterstrasse, in said Frankfort-on-the-Main, in the Empire of Germany, have invented certain new and useful Improvements Relating to the Packing of Pipe-Joints, of which the following is a specification.

This invention relates to packing for pipe joints of all kinds, the essential feature of which consists in that a soft metal packing ring surrounds the outsides of the ends of the pipes to be connected and lies with its outer surface against a sleeve fastened on the ends of the pipes, while it is held at its end surfaces between annular flanges which are fixed on the pipes and are preferably formed with feather edges.

Figure 1:
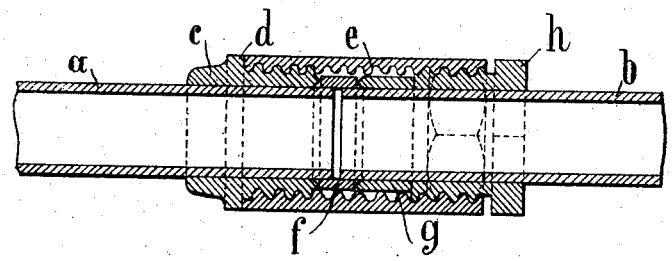
Figure 2:
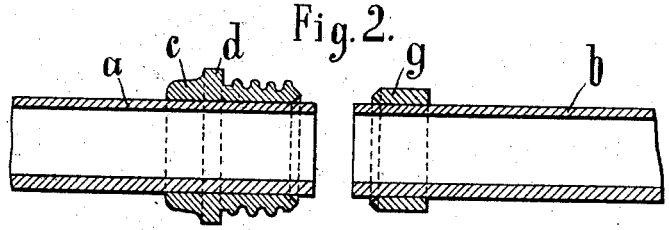
Figure 3:
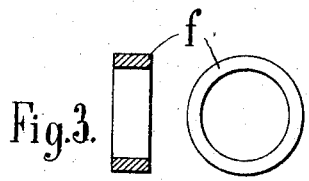
Figure 4:
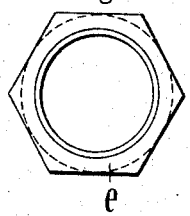
Figure 5:
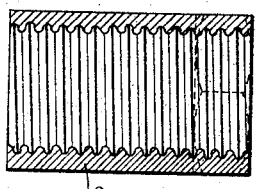
Figure 6:
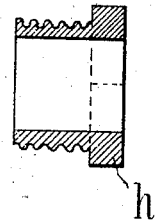

In the drawing, Figure 1 shows in longitudinal section two pipes connected together according to this invention, and Fig. 2 shows the pipes taken apart, in longitudinal section; Fig. 3 shows the packing ring in section and elevation; Fig. 4 shows the connecting sleeve for the two pipes in front elevation, and Fig. 5 in longitudinal section. Fig. 6 shows in longitudinal section the gland or compressing ring to be screwed into the connecting sleeve.

On one pipe $a$ of the two pipes $a$, $b$ to be connected, is fixed a collar $c$ of any suitable form preferably by means of hard solder or the like, one end of which is provided with screw threads, while the other end has an annular flange $d$ against which abuts a connecting sleeve $e$ provided with internal screw threads. One end of this sleeve $e$ is made in the form of a hexagonal nut to permit the application thereto of a key or spanner. On the other pipe $b$ is fixed a ring $g$, the diameter of which is such that the pipe $b$ can be pushed into the connecting sleeve $e$ screwed on to the collar $c$ of the pipe $a$. Between the collar $c$ and the ring $g$ is placed the packing ring $f$ of soft metal which bridges the joint between the ends of the pipes, and in order to make a better joint, the surfaces of the collar $c$ and of the ring $g$ next to the ring $f$ are made feather-edged in a known manner. The pressing together of the two pipes $a$ and $b$ is effected by means of a gland or compressing screw $h$ which is screwed into the connecting sleeve $e$ and presses at its front end against the ring $g$ on the pipe $b$. It will be observed that as the parts are tightened, the packing ring is forced into close engagement with the sleeve and the sides of the pipes, thereby making a leak-tight joint.

The present invention is particularly adapted for use in the construction of steam pipe systems, such, for instance, as are present in high pressure boilers and super-heaters. Such devices are designed to work at a pressure of 50 or 60 atmospheres and are tested up to 80 or 90 atmospheres. In applying my invention, I prefer to form the packing ring of copper or brass, which, while hard material as compared with lead or the like, is relatively soft as compared with the steel of which the other parts of the joint are usually made. I found in practice that the joint provided by my invention is able to withstand the excessive pressure required under all of the conditions of use.

I claim:

1. A packing for pipe joints including in combination a packing ring surrounding the ends of the pipes and bridging the joint between the latter, and means for pressing the metal of such ring laterally against the outer surfaces of the pipes, such means including members fixed to the respective pipe ends.

2. A packing for pipe joints including in combination a packing ring of soft metal surrounding the ends of the pipes and bridging the joint between the latter, annular members fixed to the pipe ends on each side of said packing ring, and means for pressing such annular members toward each other whereby to force the metal of the packing ring laterally against the outer walls of the pipes.

3. A packing for pipe joints including in combination a packing ring surrounding the ends of the pipes and bridging the joint between the latter, a sleeve surrounding such packing ring, and means for pressing said packing ring between such sleeve and the outer walls of the pipes, such means including members fixed to the respective pipe ends.

4. A packing for pipe joints including in combination a packing ring of soft metal surrounding the ends of the pipes and bridging the joint between the latter, and annular members $c$ and $g$ fixed to the pipe ends and adapted to press against said packing ring and force the metal thereof against the outer surfaces of the pipes.

5. A packing for pipe joints including in combination a packing ring of soft metal surrounding the ends of the pipes and bridging the joint between the latter, and annular members $c$ and $g$ fixed to the pipe ends and adapted to press against said packing ring and force the metal thereof against the outer surfaces of the pipes, said members $c$ and $g$ being provided with angular edges which bear against the packing ring.

6. A packing for pipe joints including in combination a packing ring of soft metal surrounding the ends of the pipes, annular members $c$ and $g$ fixed to the respective pipes, a sleeve $e$ screwing on the member $c$, and a sleeve $h$ threading upon the sleeve $e$ and adapted to press the members $c$ and $g$ against the packing ring.

7. A packing for pipe joints including in combination members fixed to the ends of the pipes, a soft metal packing ring between the ends of such members, said ring bridging the ends of the pipes and surrounding the joint between the latter, and means acting against such members adapted to rigidly and inelastically draw the pipes toward each other to force said members against said packing ring.

8. A packing for pipe joints including in combination members fixed to the ends of the pipes, said members having angular edges, a soft metal packing ring between the ends of such members, and in contact with such edges, said ring bridging the ends of the pipes and surrounding the joint between the latter, and means acting against such members adapted to rigidly and inelastically draw the pipes toward each other to force said members against said packing ring so that the edges of such members bite into said ring.

In witness whereof I have hereunto signed my name in the presence of two subscribing witnesses.

GUSTAV FRANZ MILLER.

Witnesses:
   OTTO FROMME,
   JEAN GRUND.